United States Patent [19]

Morey

[11] Patent Number: 5,351,273

[45] Date of Patent: Sep. 27, 1994

[54] PROCESS AND SYSTEM FOR THE TRANSMISSION OF A SIGNAL

[76] Inventor: Gilles Morey, Le Bas Bernin Cidex 55, Bernin F-38190 Brignoud, France

[21] Appl. No.: 936,322

[22] Filed: Aug. 28, 1992

Related U.S. Application Data

[63] Continuation of Ser. No. 436,241, Nov. 14, 1989, abandoned.

[30] Foreign Application Priority Data

Nov. 14, 1988 [FR] France .................. 88 14782

[51] Int. Cl.[5] .......................................... H04L 27/10
[52] U.S. Cl. ...................................... 375/48; 375/65; 375/66; 375/91
[58] Field of Search ................. 375/44, 45, 48, 51, 375/62, 65, 66, 88, 89, 91; 329/300, 303; 332/100, 101; 340/825.72, 825.73, 825.74, 825.75, 825.76; 455/42, 49, 50, 206

[56] References Cited

U.S. PATENT DOCUMENTS

| | | | |
|---|---|---|---|
| 1,504,303 | 8/1924 | Affel ............................... | 375/40 |
| 1,795,393 | 3/1931 | Herman .......................... | 375/45 |
| 2,397,884 | 4/1946 | Rhodes ........................... | 375/48 |
| 2,676,203 | 4/1954 | Phelps ............................ | 375/51 |
| 3,652,805 | 3/1972 | Wisner ...................... | 340/825.73 |
| 4,001,772 | 1/1977 | Powell et al. ............ | 340/825.75 |
| 4,005,428 | 1/1977 | Graham ..................... | 340/825.75 |
| 4,090,135 | 5/1979 | Farstad et al. ................. | 375/45 |
| 4,188,503 | 2/1980 | Pagano et al. ................. | 375/91 |
| 4,234,852 | 11/1980 | McCorkle ...................... | 375/91 |
| 4,349,915 | 9/1982 | Costas ............................ | 375/40 |
| 4,464,756 | 8/1984 | Tromborg ....................... | 375/91 |
| 4,475,219 | 10/1984 | Puckette ......................... | 375/88 |
| 4,577,333 | 3/1986 | Lewis et al. .................... | 375/45 |
| 4,631,538 | 12/1986 | Carreno ......................... | 375/88 |

FOREIGN PATENT DOCUMENTS

| | | |
|---|---|---|
| 897703 | 6/1953 | Fed. Rep. of Germany . |
| 2207396 | 6/1974 | France . |
| 8687205 | 2/1953 | United Kingdom . |

*Primary Examiner*—Benedict V. Safourek
*Attorney, Agent, or Firm*—Beveridge, DeGrandi, Weilacher & Young

[57] ABSTRACT

A system for the transmission of a signal having at least two conditions includes a device for emitting signals that has two oscillators whose signal amplitudes are alternately switched according to the two conditions of the binary signal. One of the oscillators generates a first frequency and the other a second frequency. A reception device is provided and has signal detectors which are independently sensitive to the first and second frequencies so that the reception device supplies, at its output, the binary signal or the inverse thereof, which are received over the first and the second frequencies. A process for the transmission of a plurality of signals or messages having at least two conditions includes the steps of emitting signals indicative of the conditions over different transmission channels and emitting signals indicative of one of the conditions of the messages over a common transmission channel. Thus, the messages can be reconstructed after reception of one of the transmitted condition signals. A command signal can be produced when all of the transmission channels are simultaneously activated for a predetermined period.

12 Claims, 1 Drawing Sheet

PROCESS AND SYSTEM FOR THE TRANSMISSION OF A SIGNAL

This application is a continuation of application Ser. No. 07/436,241, filed Nov. 14, 1989, now abandoned.

BACKGROUND OF THE INVENTION

The present invention relates to the field of the transmission of signals with a view to transmitting information or messages.

An object of the present invention is to provide a process and a system which permit a considerable increase in the reliability of the transmission of signals or of information.

Another object of the present invention is to be able to detect when it is impossible to receive the signals or the information which is desired to be transmitted.

Another object of the present invention is to be able to bring about the coexistence of a plurality of networks for the transmission of signals or of information which are assigned to different functions, each comprising a plurality of independent emitters and a plurality of independent receivers, the emitters of one network not disturbing the receivers of another network, the networks nevertheless having the possibility of exchanging signals or information between them.

Another object of the present invention is to be able to combine the objectives set forth hereinabove.

Another object of the present invention is to be able to accomplish these objectives at very low costs, in particular by virtue of simple radio transmission means.

SUMMARY OF THE INVENTION

The present invention relates, first of all, to a process for signal transmission.

According to one subject, the present invention pertains to a process for the transmission of a signal having at least two conditions, such as a binary signal, which consists in emitting one of the conditions of the binary signal on a first transmission channel and its other condition on a second transmission channel and that it consists in detecting or receiving independently and respectively each condition of the binary signal on the corresponding transmission channel in such a manner as to be able to reconstruct the binary signal on the basis of the reception of a single one of its two conditions via one of the transmission channels.

The process set forth hereinabove may advantageously consist, furthermore, in producing a command signal when the two transmission channels are, for a determined duration, simultaneously activated or excited by one or more signals disturbing them.

The subject of the present invention is also a process for the transmission of a signal having at least two conditions, which consists in emitting each condition of the signal respectively on a plurality of transmission channels, simultaneously or successively, in detecting or receiving independently and respectively the conditions of the signal on the corresponding transmission channels, in such a manner as to be able to reconstruct the signal on the basis of the reception of a single one of its conditions via any one of the transmission channels, this process consisting, furthermore, in producing a command signal when all the aforementioned transmission channels are, for a determined duration, simultaneously activated or excited by one or more signals disturbing them.

The subject of the present invention is also a process for the transmission of a signal, which consists in emitting the signal on one or more occasions successively on a plurality of transmission channels, in detecting or receiving the signal independently and respectively on the said transmission channels in such a manner as to be able to supply this signal representing the information on the basis of its reception on any one of the transmission channels, and in producing a command signal when all the aforementioned transmission channels are, for a determined duration, simultaneously activated or excited by one or more signals disturbing them.

The subject of the present invention is, furthermore, a process for the transmission of a plurality of signals having at least two conditions, which consists in emitting one of the conditions of at least two of the signals on a common transmission channel, in such a manner as to be able to reconstruct these signals on the basis of the reception, via this common transmission channel, of a single one of their conditions.

The present invention also relates to a signal transmission system.

The subject of the present invention is a system for the transmission of a signal having at least two conditions such as a binary signal. This system comprises a device for the emission of signals comprising either two oscillators switched in amplitude alternately by the two conditions of the binary signal ($B_1$) and capable of emitting, one on a first frequency ($f_0$) and the other on a second frequency ($f_1$) or an oscillator switched in frequency by the binary signal and capable of emitting on a first frequency ($f_1$) only when the binary signal is in one of its conditions and on a second frequency ($f_2$) only when the binary signal is in its other condition. It further comprises a reception device comprising either two signals detectors sensitive respectively and independently to the said first and second frequencies ($f_0$, $f_1$) or a single scanning or frequency scrutinizing detector capable of detecting independently the said first and second frequencies ($f_1$, $f_2$), in such a manner as to supply at its output the binary signal or its inverse, which are received via the first or the second of the said frequencies.

According to the present invention, the system may further comprise a second device for the emission of signals comprising an oscillator switched in amplitude by one of the conditions of another binary signal ($B_0$) and capable of emitting on only one of the aforementioned frequencies ($f_0$), so that the reception device supplies this other binary signal ($B_0$) at its output.

According to the present invention, the system may likewise comprise a second device for the reception of signals comprising a detector sensitive only to one of the aforementioned frequencies ($f_0$), in such a manner as to supply the binary signal ($B_1$) at its output.

According to the present invention, the system may advantageously comprise a second device for the emission of signals ($B_2$) comprising either an oscillator switched in frequency by a second binary signal ($B_2$) and capable of emitting on the said second frequency ($f_1$) only when this second binary signal ($B_2$) is in one of its conditions and on a third frequency ($f_2$) only when this second binary signal ($B_2$) is in its other condition, or two oscillators switched in amplitude alternately by the two conditions of this second binary signal and capable of emitting, one on the said second frequency ($f_1$) and the other on a third frequency ($f_2$); as well as a second reception device comprising either a single scanning or frequency scrutinizing detector capable of detecting independently the said second and third frequencies ($f_1$, $f_2$) or two detectors of signals sensitive respectively and independently to the said second and third frequencies ($f_0$, $f_1$); in such a manner as to supply on the outputs of the reception devices the said binary signals ($B_1$, $B_2$) or their inverse.

According to the present invention, the reception device preferably comprises means for supplying a command signal when the two frequencies to which it is sensitive are, for a determined duration, simultaneously excited or activated by one or more signals disturbing them.

The subject of the present invention is likewise a system for the transmission of a plurality of binary signals, which comprises emission devices adapted to emit respectively the said binary signals ($B_0$, $B_1$, $B_2$), as well as reception devices adapted to receive the binary signals emitted by the emission devices; at least two of the aforementioned emission devices being adapted to emit one of the conditions of the corresponding binary signals on a common frequency.

The subject of the present invention is also a system for the transmission of a plurality of binary signals between a plurality of emission devices and a plurality of reception devices. At least one first emission device comprises an oscillator switched in amplitude by one of the conditions of a first binary signal ($B_0$) and capable of emitting on a first frequency ($f_0$) and at least one second emission device comprises either an oscillator switched in frequency by a second binary signal and capable of emitting on the said first frequency ($f_0$) only when this second binary signal is in one of its conditions and a second frequency ($f_1$) only when this second binary signal is in its other condition, or two oscillators switched in amplitude alternately by the two conditions of the second binary signal and capable of emitting one on the said first frequency ($f_0$) and the other on a second frequency ($f_1$). At least one first reception device comprises a detector sensitive only to the first aforementioned frequency ($f_0$) in such a manner as to supply at its output the first binary signal ($B_0$) or the second binary signal ($B_1$), and at least one second reception device comprises either two detectors of signals sensitive respectively and independently to the first and second aforementioned frequencies ($f_0$, $f_1$) or a single frequency scanning detector capable of detecting independently the said second and third frequencies ($f_1$, $f_2$), in such a manner as to supply on its output the aforementioned binary signals ($B_0$, $B_1$), or their inverse.

In the transmission system, the second reception device comprises means capable of supplying a command signal when the two frequencies ($f_0$, $f_1$) are, for a determined duration, simultaneously excited or activated by one or more signals disturbing them.

In a variant of the invention, the emission devices and the reception devices are preferably connected by means of radio.

BRIEF DESCRIPTION OF THE DRAWINGS

The present invention will be better understood on studying a signal transmission system formed of a plurality of networks, which is described by way of non-limiting example and illustrated diagrammatically in the accompanying FIG. 1, the accompanying FIG. 2 representing a mode of transmission of a signal.

DETAILED DESCRIPTION OF THE PREFERRED EMBODIMENTS

Figure 1:
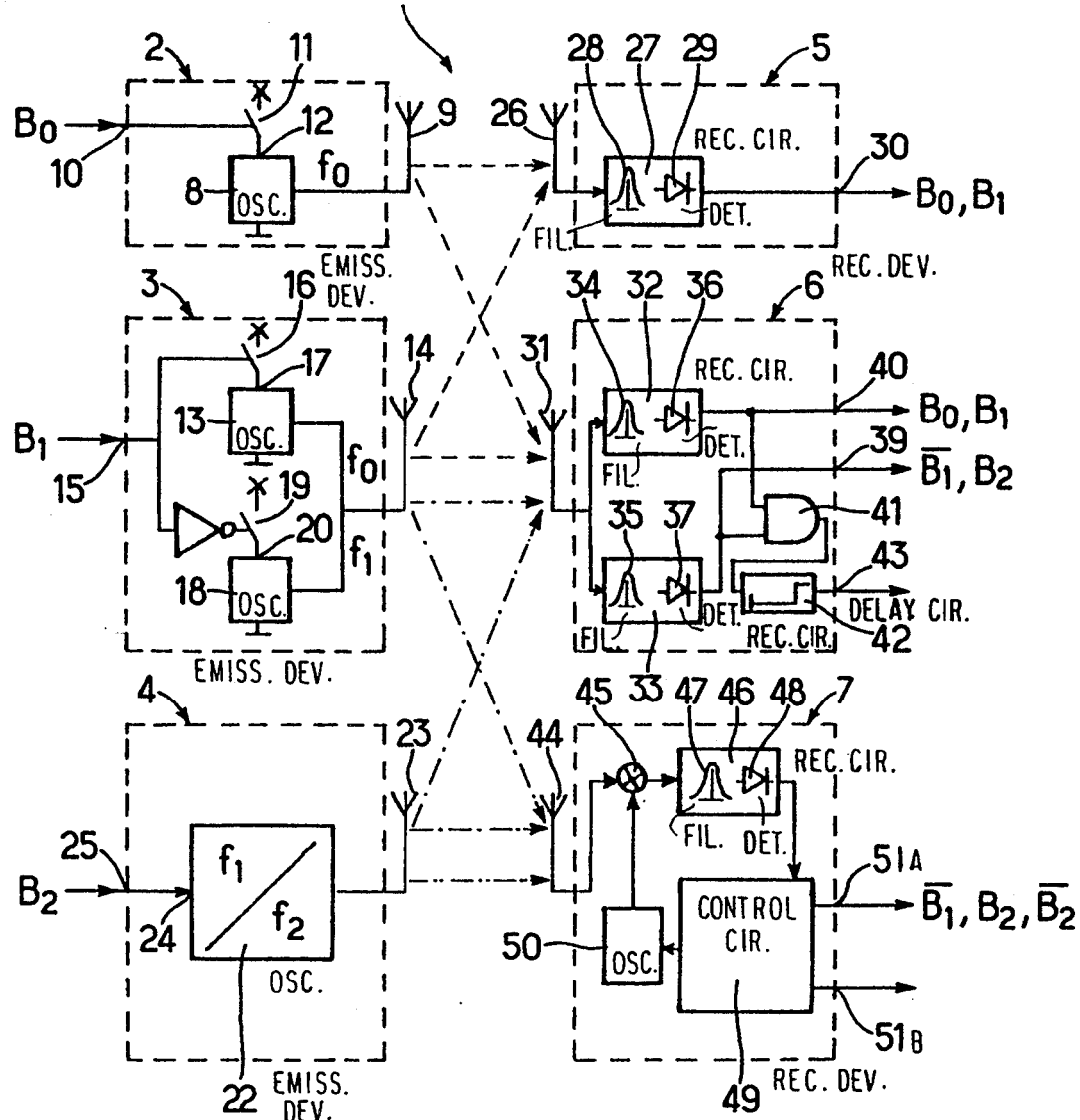

The signal transmission system represented in the figure in a general way by the reference 1 comprises three independent devices for the emission of signals identified by the references 2, 3 and 4, as well as three independent devices for the reception of signals referenced respectively 5, 6 and 7. These emission devices and these reception devices are, in the example, connected by means of radio.

In the example, the emission devices are intended to transmit respectively binary signals $B_0$, $B_1$, $B_2$. Each one of these binary signals is composed of a condition ONE and of a condition ZERO, this binary signal or a succession of binary signals representing information or messages to be transmitted.

The emission device 2 comprises an oscillator circuit 8 connected to an emitting antenna 9. It comprises an input 10 for the binary signal $B_0$, which is connected to a switch 11, which is itself connected to a command input 12 of the oscillator circuit 8.

The emission device 2 operates in the following manner. When the binary signal $B_0$ is in its condition ONE, the switch 11 switches the oscillator circuit 8 in amplitude. This circuit 8 is controlled in such a manner as to oscillate on a frequency $f_0$ and the antenna 9 radiates this frequency $f_0$. When the binary signal $B_0$ is in its condition ZERO, the oscillator circuit 8 is blocked and the antenna 9 does not radiate. Thus, the antenna 9 radiates the binary signal $B_0$ on the frequency $f_0$.

Just like the emission device 2, the emission device 3 comprises an oscillator circuit 13 connected to an emitting antenna 14, an input 15 for the binary signal $B_1$, which input is connected to a switch 16, which is itself connected to a command input 17 of the oscillator circuit 13. As in the case of the emission device 2, the oscillator circuit 13 is switched in amplitude by the binary signal $B_1$ and emits on the same frequency $f_0$ as the oscillator circuit 8 of the device 2. Thus, the antenna 14 radiates on the frequency $f_0$ when the binary signal $B_1$ is in its condition ONE.

The emission device 3 further comprises a second oscillator circuit 18, the output of which is likewise connected to the antenna 14, a switch 19 which is connected to the switching input 20 of the oscillator circuit 18 as well as an inverter 21 which connects the input 15 to the switch 19. When the binary signal $B_1$ input by the input 15 is in its condition ZERO, this condition is inverted by the inverter 21 and the switch 19 switches in amplitude the oscillator circuit 18, which is controlled in order to oscillate on a frequency $f_1$ different from $f_0$, so that the antenna 14 radiates on this frequency $f_1$.

Figure 2:
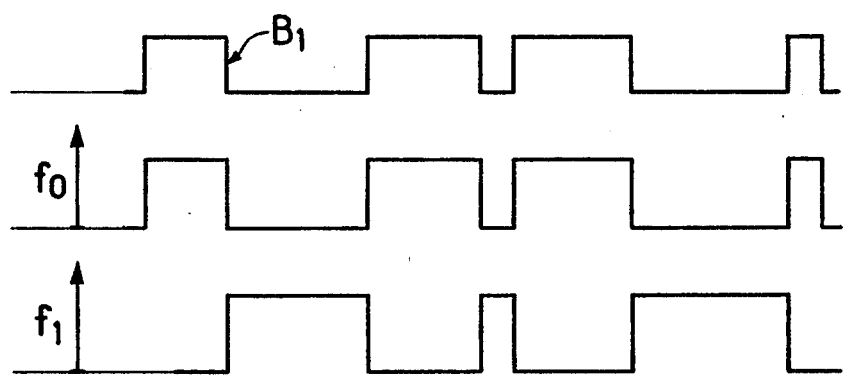

Accordingly, the emission device 3 is constructed in such a manner that its antenna 14 emits on the frequency $f_0$ when the binary signal $B_1$ is in its condition ONE and emits on the frequency $f_1$ when the binary signal $B_1$ is in its condition ZERO. This mode of operation appears in FIG. 2.

Thus, the emission device 3 is adapted to emit simultaneously the binary signal $B_1$ and its inverse, on two different channels.

The emission device 4 differs from the emission device 3 in that it comprises only a single oscillator circuit 22 which, on this occasion, is a frequency hopping oscillator circuit, the output of which is connected to an antenna 23 and the command input 24 of which is connected to an input 25 by which the binary signal $B_2$ is input. The oscillator circuit 22 is controlled in such a manner as to oscillate at the same frequency $f_1$ as the oscillator circuit 18 of the emission device 3 when the binary signal $B_2$ is in its condition ONE. On the other hand, when the binary signal $B_2$ is in its condition ZERO, the oscillator circuit 22 oscillates at a frequency $f_2$ different from $f_0$ and $f_1$. These frequencies $f_1$ and $f_2$ are radiated by the antenna 23. The emission device 4 is therefore likewise adapted to emit simultaneously the binary signal $B_2$ and its inverse, on two different channels.

The reception device 5 comprises an antenna 26 which is connected to the input of a reception circuit 27, which comprises a filter 28 and a detector 29, its output being connected to a signal output 30. This reception circuit 27 is locked or controlled in order to be sensitive to the radio signals appearing on the frequency $f_0$ in such a manner that it is sensitive to the signals emitted by the emission devices 2 and 3 on this frequency. Thus, the reception device 5 is capable of receiving and of supplying at its output 30 the binary signal $B_0$ emitted by the emission device 2 and likewise the binary signal $B_1$ emitted by the emission device 3.

The reception device 6 comprises an antenna 31 which is connected to two independent reception circuits 32 and 33 which comprise respectively filters 34 and 35 and detectors 36 and 37. The detection circuit 32 is locked in order to be sensitive to the radio signals appearing on the frequency $f_0$, while the detection circuit 33 is locked in order to be sensitive to the radio signals appearing on the frequency $f_1$. The output of the detection circuit 32 is connected to a signal output 40, while the output of the detection circuit 33 is connected to a second output 39.

Just like the reception device 5, the reception device 6 is capable of receiving, by virtue of its detection circuit 32 locked to the frequency $f_0$, the signal $B_0$ emitted by the emission device 2 and the signal $B_1$ emitted by the emission device 3 and of supplying at its output 40 these binary signals $B_0$ and $B_1$.

Furthermore, the reception device 6 is capable of receiving, by virtue of its reception circuit 33 locked to the frequency $f_1$, the inverse of the binary signal $B_1$ emitted by the emission device 3 and of supplying this inverse at the output 39.

It should be observed that the signal $B_1$ and its inverse which are simultaneously emitted by the emission device 3 are simultaneously received by the reception device 6 and the reception device 6 is capable of supplying the signal $B_1$ or its inverse on the basis of the reception of a single one of the conditions of the signal $B_1$ via one of the frequencies $f_0$ or $f_1$.

As has been seen, the emission device 4 emits likewise on the frequency $f_1$ to transmit the binary signal $B_2$. As the reception device 6 is sensitive to this, it is likewise capable of receiving and of supplying at its output 39 the signal $B_2$ emitted by the emission device 4.

The reception device 6 likewise comprises an AND gate 41, the two inputs of which are respectively connected to the output of the reception circuits 32 and 33 and the output of which is connected to the input of a time delay circuit 42 connected to a command signal output 43.

When the two detection circuits 32 and 33 are excited at the same time during the duration of the time delay of the time delay circuit 42, a command signal appears at the output 43 of the reception device 6. The appearance of this command signal signifies that the transmission channels associated with the frequencies $f_0$ and $f_1$ to which the detection circuits 32 and 33 are respectively sensitive, are excited simultaneously and that in consequence no signal detection is validly capable of being carried out.

The reception device 7 is of a type different from that of the reception device 6 but exhibits the same functions. It is a scanning or frequency scrutinizing detection device which comprises an antenna 44 which is connected to the input of a frequency mixer 45, the output of which is connected to an intermediate frequency detection circuit 46 comprising a filter 47 and a detector 48. The output of this detection circuit 46 is connected to the input of a processing, command and feedback control circuit 49, one output of which is connected to the command input of a frequency controlled oscillator 50 which supplies the various local frequencies to the mixer 45. The circuit 49 exhibits a received signal output 51A and a command signal output 51B.

This reception device 7 is controlled or locked in such a manner as to be able to detect the radio signals appearing on the frequencies $f_1$ and $f_2$. It is therefore capable of supplying at its output 51A the inverse of the binary signal $B_1$ and the binary signal $B_2$ emitted respectively by the emission devices 3 and 4 on the frequency $f_1$ as well as the inverse of the binary signal $B_2$ emitted by the emission device 4 on the frequency $f_2$. It is moreover adapted to supply a command signal on its output 51B when the two transmission channels associated with the frequencies $f_1$ and $f_2$ are excited simultaneously for a determined duration, this function being performed by the processing circuit 49.

The transmission system 1 described hereinabove exhibits numerous advantages. In fact, its structure permits, in particular, the assurance, in a simple manner, of a very reliable transmission of signals and detection of when it is impossible to receive signals which are desired to be transmitted.

In fact, the binary signal $B_1$ or its inverse passes by means of radio from the emission device 3 to the reception device 6 through two independent transmission channels associated with the frequencies $f_0$ and $f_1$, and this takes place simultaneously, so that if one of the transmission channels is disturbed, the binary signal $B_1$ or its inverse is nevertheless transmitted by the other transmission channel. This same objective is likewise achieved by the pair formed by the emission device 4 and the reception device 7, since the binary signal $B_2$ or its inverse may pass independently through the transmission channels associated with the frequencies $f_1$ and $f_2$.

Furthermore, if the two transmission channels associated with the frequencies $f_0$ and $f_1$ are excited simultaneously for a duration at least equal to the delay time of the time delay circuit 42, this means that these two channels are at the same time disturbed or unavailable and that the transmission of the binary signal $B_1$ between the emission device 3 and the reception device 6 is impossible, this fact being indicated by the appearance of a command signal at the output 43 of this reception device 6. The pair formed by the emission device 4 and the reception device 7 likewise ensures this objective.

The binary signal $B_0$ emitted by the emission device 2 may be received by the reception devices 5 and 6, the binary signal $B_1$ or its inverse emitted by the emission device 3 may be received by the reception devices 5, 6 and 7 and the binary signal $B_2$ or its inverse emitted by the emission device 4 may be received by the reception devices 6 and 7, these links by means of radio utilizing only three transmission channels associated with the frequencies $f_0$, $f_1$ and $f_2$.

The objectives and advantages of the transmission system 1 which have been described hereinabove are particularly beneficial in the following application, in which a multiplicity of independent emitters may emit in a random and/or simultaneous manner.

The transmission system 1 may, in fact, constitute a system of linkage by means of radio to a plurality of networks, for example a network for the monitoring and control of household appliances and a network for the security of assets and of persons, this security system being, in a general way, an alarm system. In this case, the binary signals $B_1$ and $B_2$ might be generated by detectors linked to the security of the property and persons and the signal $B_0$ might be generated by emitters linked to the monitoring and to the control of household appliances.

As is evident from the aforegoing, a security signal, for example the signal $B_1$ or the signal $B_2$, would be transmitted simultaneously and in a reliable and redundant manner on two transmission channels, it being possible for one channel to be disturbed or blocked without consequence upon the transmission of the said security signal. If the two transmission channels linked to this security signal are, for example, jammed at the same time, what is then involved would with a high degree of probability be a deliberate jamming and the command signal generated would then constitute an alarm command signal. The detection of jamming is not necessary where what is involved is the transmission of the signal $B_0$, concerning which it can be considered that the function is less important than the function of the signals $B_1$ and $B_2$ which are linked to security.

The present invention is not limited to what has just been described. In particular, the transmission system 1 might comprise other emission devices and other reception devices. The signals $B_0$, $B_1$ and $B_2$ might be signals having more than two conditions or concerning messages or concerning a repetition of messages each composed of a succession of signals, each one of these conditions or messages being capable of passing simultaneously or successively through more than two transmission channels, as might be done by the frequency hopping oscillator 22 in association with synchronized receivers, each channel permitting the reconstruction of the entirety of the message or of the information emitted. Each binary signal might, for example, be multiplexed between more than two transmission channels, each channel permitting the independent reconstruction of the entirety of the message or of the information emitted.

What is claimed is:

1. A system for transmission of an information signal having at least two conditions which indicate transmittable information, said system comprising:
   a signal emission device which has an input for receiving a signal to be transmitted, and oscillator means for transmitting a first transmission signal on a first carrier frequency when the information signal is in a first of its at least two conditions and transmitting a second transmission signal on a second carrier frequency when the information signal is in a second of its at least two conditions, each of the first and second transmission signals containing the transmittable information, each of the first and second carrier frequencies forming an independent transmission channel to provide said signal emission device with two independent transmission channels; and
   a receiving device for providing an output signal which contains the information of the information signal whenever one of the transmission signals is received thereby, the receiving device including two independent channel detecting means for respectively receiving the first and second transmission signals over the first and second carrier frequencies, a first means for reconstructing the information signal in response to reception of only the first transmission signal, a second means for reconstructing the information signal in response to reception of only the second transmission signal, and an output means, connected to the first and second reconstructing means, for providing a reconstructed information signal from the first means for reconstructing or the second means for reconstructing,
   whereby the transmittable information is provided by the output means as a result of reconstruction of the information signal by either the first reconstructing means or the second reconstructing means, even when one of the transmission channels is disturbed.

2. A system as claimed in claim 1, wherein the oscillator means for transmitting first and second transmission signals comprises two independent oscillators and the receiving channels comprise two independent detectors.

3. A system as claimed in claim 2, comprising:
   a further signal emission device that includes oscillator means which generates a third signal at said second frequency to represent a first condition of another signal having at least two conditions and which generates a fourth signal at a third frequency to represent a second condition of said another signal; and
   a further signal receiving device that includes detecting means for independently detecting either of said third and fourth signals on said second and third frequencies respectively,
   said receiving device being located with respect to said further signal emission device so as to receive said third signal, at said second frequency, when generated by said further signal emission device, and
   said further signal receiving device being located with respect to said signal emission device so that said detecting means thereof can detect said second frequency when transmitted by said signal emission device.

4. A system as claimed in claim 3, wherein said oscillator means of said further signal emission device is switchable in frequency and said detecting means of said further signal receiving device comprises a scanning detector.

5. A system as claimed in claim 4, wherein one of said signal receiving devices comprises means for supplying a command signal when said frequencies to which said one signal receiving device is sensitive are received thereby for a predetermined duration.

6. A system as claimed in claim 2, comprising another signal emission device that includes an oscillator which generates only one of said first or second frequencies in response to one of said at least two conditions, and another signal receiving device that includes a detecting means which provides an output in response to receipt of only one of said transmission signals from said emission device, said receiving device being located with respect to said another signal emission device so as to receive said one frequency generated thereby, and said another receiving device being located with respect to said signal emission device so that said detecting device thereof can detect said one of said transmission signals.

7. A process for transmitting information contained in an information signal having at least two conditions which is provided at an input of an emitting means and which is obtainable at an output of a receiving means, said process comprising the steps of:

changing said information signal into at least a first transmission signal and a second transmission signal, each transmission signal having conditions representative of information to be transmitted, providing at least two independent transmission channels having different carrier frequencies;

independently emitting said first and second transmission signals respectively on said two transmitting channels; and independently receiving said carrier frequencies of said transmission channels and independently detecting said transmission signals transmitted by said channels;

reconstructing said information signal only in response to reception of said first transmission signal via one of said transmission channels to provide a first reconstructed information signal, reconstructing said information signal only in response to reception of said second transmission signal via the other of said transmission channels to provide a second reconstructed information signal; and applying reconstructed information signals to said output of said receiving means;

whereby said information contained in said information signal is obtained at the output of said receiving means either in said first reconstructed information signal, or in said second reconstructed information signal, even when one of said transmission channels is disturbed.

8. A process according to claim 7, further comprising the steps of changing another information signal including other information into a third transmission signal having conditions which indicate the information of said another information signal, emitting said third transmission signal on a first of said transmission channels, reconstructing said another information signal by receiving said third transmission signal via said one of said transmission channels, whereby said information is obtained at said output of the receiving means if said third transmission signal is emitted over said first transmission channel simultaneously when said first or second transmission signals are emittable over said first transmission channel.

9. A process for transmitting information to be transmitted, said information being provided by two information signals which each have at least two conditions, said information signals being provided at an input of an emitting means and obtainable at an output of a receiving means, said process comprising the steps of:

respectively changing said information signals into at least a first transmission signal and a second transmission signal, each transmission signal having conditions which represent information respectively to be transmitted;

providing independent transmission channels having different carrier frequencies;

emitting said first transmission signals on a common transmission channel and emitting said second transmission signals on a second transmission channel and a third transmission channel respectively, independently receiving said carrier frequencies of said transmission channels and detecting said conditions thereof in order to obtain said transmission signals transmitted via said channels, respectively reconstructing said information signals only in response to reception of said first transmission signals via said common transmission channel, respectively reconstructing said information signals only in response of reception of said second transmission signals via said second and third channels, and providing reconstructed information signals at said output of said receiving means whereby said information to be transmitted are obtained at said output of said receiving means, even when one of said transmission channels is perturbed, and whereby four transmission signals are transmitted via three transmission channels.

10. A process according to claim 9, wherein said information signals are binary signals.

11. A process according to claim 10, further comprising the step of producing a control signal when said transmission channels are activated by a disturbing signal which is different from said transmission signals, for a predetermined time.

12. A process according to claim 11, wherein said step of emitting said transmission signals is repeated on said transmission channels thereof.

* * * * *